US011048648B2

(12) United States Patent
Wang et al.

(10) Patent No.: US 11,048,648 B2
(45) Date of Patent: Jun. 29, 2021

(54) SOC CHIP AND METHOD FOR CONTROLLING BUS ACCESS

(71) Applicant: SHENZHEN GOODIX TECHNOLOGY CO., LTD., Guangdong (CN)

(72) Inventors: Dongge Wang, Shenzhen (CN); Jian Wei, Shenzhen (CN)

(73) Assignee: Shenzhen Goodix Technology Co., Ltd.

( * ) Notice: Subject to any disclaimer, the term of this patent is extended or adjusted under 35 U.S.C. 154(b) by 40 days.

(21) Appl. No.: 16/686,014

(22) Filed: Nov. 15, 2019

(65) Prior Publication Data

US 2020/0089628 A1 Mar. 19, 2020

Related U.S. Application Data

(63) Continuation of application No. PCT/CN2018/099983, filed on Aug. 10, 2018.

(51) Int. Cl.
G06F 13/16 (2006.01)
G06F 9/4401 (2018.01)
G06F 21/60 (2013.01)

(52) U.S. Cl.
CPC ............ G06F 13/16 (2013.01); G06F 9/4401 (2013.01); G06F 21/602 (2013.01); G06F 2213/16 (2013.01)

(58) Field of Classification Search
CPC ....... G06F 13/16; G06F 9/4401; G06F 21/602
See application file for complete search history.

(56) References Cited

U.S. PATENT DOCUMENTS 8,046,571 B1 10/2011 Feng et al.
9,652,637 B2 5/2017 Dellow et al.
(Continued)

FOREIGN PATENT DOCUMENTS

CN 102129530 A 7/2011
CN 102520961 A 6/2012
(Continued)

OTHER PUBLICATIONS

Extended European Search Report dated Sep. 23, 2020, Patent Application No. 18917575.5, 5 pages.
(Continued)

Primary Examiner — Henry Tsai
Assistant Examiner — Christopher A Daley
(74) Attorney, Agent, or Firm — Davis Wright Tremaine LLP

(57) ABSTRACT

A SoC chip includes: a bus mechanism including at least one MPU; an OTP memory configured to store bus access control information; a mode configuring module connected to at least one MPU and the OTP memory, the mode configuring module being configured to read the bus access control information from the OTP memory when the SoC chip is in a boot mode, and configure the MPU using the bus access control information, and the mode configuring module being further configured to enable the MPU and switch the SoC chip to a user mode upon configuration of the MPU. The bus access control information is stored by using the OTP memory, so that corresponding bus access control information may be written into the OTP memory according to requirements of various application scenarios, thereby being adapted to different application scenarios and having great flexibility.

13 Claims, 6 Drawing Sheets

(56) References Cited

U.S. PATENT DOCUMENTS

| | | | | |
|---|---|---|---|---|
| 9,690,719 | B2* | 6/2017 | Steinert | G06F 9/5022 |
| 9,767,044 | B2* | 9/2017 | Chhabra | G06F 12/0808 |
| 9,904,802 | B2* | 2/2018 | Rohleder | G06F 21/71 |
| 10,289,303 | B2* | 5/2019 | Li | G06F 3/0659 |
| 10,452,287 | B2* | 10/2019 | Wokhlu | G06F 9/50 |
| 2008/0294838 | A1 | 11/2008 | Houston et al. | |
| 2011/0067110 | A1* | 3/2011 | Markey | G06F 21/575 |
| | | | | 726/26 |
| 2013/0227235 | A1* | 8/2013 | Berenbaum | G06F 3/0679 |
| | | | | 711/163 |
| 2014/0250290 | A1* | 9/2014 | Stahl | G06F 9/4401 |
| | | | | 713/2 |
| 2015/0032996 | A1 | 1/2015 | Koeberl et al. | |
| 2016/0004647 | A1* | 1/2016 | Eppensteiner | G06F 12/14 |
| | | | | 710/110 |
| 2016/0300064 | A1* | 10/2016 | Stewart | G06F 3/0619 |
| 2017/0097830 | A1 | 4/2017 | Ehrenberg et al. | |
| 2017/0329728 | A1* | 11/2017 | Karri | G06F 21/79 |
| 2019/0370439 | A1* | 12/2019 | Lin | G06F 21/12 |

FOREIGN PATENT DOCUMENTS

| | | |
|---|---|---|
| CN | 102567245 A | 7/2012 |
| CN | 104050061 A | 9/2014 |
| CN | 105335227 A | 2/2016 |
| CN | 106990747 A | 7/2017 |

OTHER PUBLICATIONS

International Search Report mailed in International Patent Application No. PCT/CN2018/099983, filed on Oct. 8, 2018, 4 pages.

* cited by examiner

SOC CHIP AND METHOD FOR CONTROLLING BUS ACCESS

CROSS REFERENCE TO RELATED APPLICATION

The present application is a continuation of international application No. PCT/CN2018/099983, filed on Aug. 10, 2018, which is hereby incorporated by reference in its entirety.

FIELD

The present disclosure relates to SoC chip technologies, and in particular, to a SoC chip and a method for controlling bus access.

BACKGROUND

As a SoC (System-on-a-Chip) chip is a chip with integrated circuits that can effectively reduce development costs of an electronic/information system product, shorten a development cycle, and improve product competitiveness, it is generally used in today's society. In a SoC chip, a bus system is a channel for transmitting information between a master device and a slave device of the chip and thus has an important role. In a traditional SoC chip architecture, a single bus system is used, that is, all the master devices share one bus, and only one master device is allowed to have an access to the bus at the same time. As the scale and complexity of the SoC chip are increased day by day, the traditional single bus system can no longer meet application requirements. A current bus structure is gradually changed from a single bus structure to a multi-layer bus structure, that is, a plurality of master devices may send access requests to slave devices on a plurality of layers of buses at the same time. Such multi-layer bus structure improves system performance so that an access request of one master device on a bus does not block other master devices, thereby improving bus efficiency.

In a bus system with a plurality of the master devices connected to slave devices, it is necessary to define an access right for each master device on the bus. Each master device can only access an address space that the master device is allowed to access. For example, an external communication interface device can only access a storage area in the system for exchanging data with the outside, and cannot control and access other resources in the system. However, an existing configuration manner of a right for bus access lacks flexibility, and the access right information of defining the master device cannot be modified. Therefore, such configuration manner may generally satisfy one application scenario, but cannot meet the needs of application of a SoC chip in various environments.

SUMMARY

Some embodiments of the present disclosure aim to provide a SoC chip and a method for controlling bus access. Bus access control information can be set differently according to different application scenarios, thereby being adapted to different application scenarios and improving flexibility of a configuration manner.

Some embodiments of the present disclosure provide a SoC chip, including: a bus mechanism including at least one MPU; an OTP memory configured to store bus access control information; a mode configuring module being configured to connect at least one MPU to the OTP memory, the mode configuring module being configured to read the bus access control information from the OTP memory when the SoC chip is in a boot mode, and configure the MPU by using the bus access control information, and the mode configuring module being further configured to enable the MPU and switch the SoC chip to a user mode upon configuration of the MPU.

Some embodiments of the present disclosure further provide a method for controlling bus access, applied to a SoC chip including a mode configuring module, an OTP memory, and a bus mechanism; the mode configuring module being configured to connect the OTP memory to an MPU in the bus mechanism; the method including: reading, by the mode configuring module, bus access control information from the OTP memory when the SoC chip is in a boot mode; configuring, by the mode configuring module, the MPU in the bus mechanism using the bus access control information; and enabling, by the mode configuring module, the MPU and switching the SoC chip to the user mode upon configuration of the MPU.

In comparison to existing technologies, in some embodiments of the present disclosure, the OTP memory is used to store the bus access control information, so that corresponding bus access control information may be written into the OTP memory depending on requirements for different application scenarios, thereby being adapted to different application scenarios and having high flexibility. In addition, in the embodiments of the present disclosure, a reading and configuration process of the bus access control information is controlled using the mode configuring module implemented by hardware, so that the process cannot be controlled and tampered by the outside, which can help improve security of the bus access control information.

In one example, an encrypting module is disposed in the OTP memory, the encrypting module being configured to encrypt, using a key preset by hardware, the bus access control information that is written into the OTP memory. The SoC chip further includes a decrypting module, the decrypting module being configured to connect the mode configuring module to the OTP memory. The mode configuring module is further configured to call the decrypting module to decrypt the read bus access control information using the key preset by hardware, and write the decrypted bus access control information into the MPU. The key preset by hardware is used for encryption and decryption, helping to prevent the bus access control information from being illegally modified.

In one example, the mode configuring module is further configured to calculate verification information corresponding to the encrypted bus access control information and write the verification information into the OTP memory after the encrypting module encrypts the bus access control information. The mode configuring module is further configured to read the verification information from the OTP memory, and verify, using the verification information, encrypted bus access control information that is currently read, and when the verification succeeds, call the decrypting module to decrypt the read bus access control information. When the bus access control information is saved, the verification information thereof is saved, helping to prevent an attacker from illegally modifying the bus access control information.

In one example, the mode configuring module is further configured to control the SoC chip to reset integrally when the verification fails, which can help to avoid a potential danger caused by the illegal modification.

In one example, the bus mechanism includes a plurality of layers of buses, each layer of buses being connected to one MPU, at least one master device, and at least one slave device; one end of the MPU being connected to the master device, and the other end being connected to the slave device. A specific structure of the bus mechanism is provided.

In one example, when the SoC chip is in the user mode, the master device is configured to send an access request through a bus of a layer on which the master device is located. The MPU is configured to determine, according to the bus access control information, legitimacy of the access request sent by the bus of the layer on which the MPU is located, and output a legal access request to the slave device corresponding to the access request. The MPU is used to first verify the legitimacy of the access request, and then output a legal access request to the corresponding slave device, helping to avoid illegal access and improving security of the SoC chip.

In one example, the MPU is further configured to intercept an illegal access request sent by the bus of the layer on which the MPU is located, return an error message to the master device corresponding to the illegal access request, and save the illegal access request. An intercepted illegal access request is saved, so that the user may view the illegal access request.

In one example, an address decoding module is further connected to each layer of buses, one end of the MPU being connected to the master device through the address decoding module. The address decoding module is configured to determine, according to address information of the slave device in the access request, the slave device corresponding to the access request, and output, to the MPU, the corresponding access request that the slave device has determined when receiving the access request sent by the master device. A method for determining a slave device corresponding to an access request is provided.

In one example, a first arbitrating module is further connected to each layer of buses, the address decoding module being connected to the master device through the first arbitrating module. The first arbitrating module is configured to assign, according to a first preset policy when receiving access requests sent by at least two master devices at the same time, a control right of a bus of a layer on which the first arbitrating module is located to one of the master devices, and output the access request of the master device that obtains the control right of the bus of the layer on which the first arbitrating module is located. A specific processing method is provided for a scenario in which a plurality of master devices simultaneously send access requests on a same layer of buses.

In one example, the bus mechanism further includes a first gating circuit in a one-to-one correspondence with the slave devices. The other end of each of the MPUs is connected to the slave device through the first gating circuit. The first gating circuit is configured to determine, according to a second preset policy when receiving access requests sent by at least two MPUs at the same time, a current to-be-responded access request of the slave device, and conduct the slave device and the master device corresponding to the determined access request. A specific processing method is provided for a scenario in which a slave device simultaneously receives access requests are from master devices on a plurality of layers.

In one example, the bus mechanism further includes a second gating circuit in a one-to-one correspondence with the MPU. Each of the MPUs is further connected to the master device through the second gating circuit. The MPU is further configured to receive response information sent by the slave device. The second gating circuit is configured to determine, according to the response information, the slave device corresponding to the response information, and conduct the determined slave device and the master device that currently acquires the control right of a bus of a layer on which the second gating circuit is located. A method for receiving response information of the slave device is provided.

In one example, the mode configuring module is further configured to switch the SoC chip to a test mode for a designated master device to write the bus access control information into the OTP memory when the SoC chip is in a boot mode and a mode control word of the OTP memory is an initial value. A scenario in which bus access control information is written into an OTP memory is provided.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, the technical solutions, and the advantages of the present disclosure clearer, the following further describes some embodiments of the present disclosure in detail with reference to the accompanying drawings and the embodiments. It should be understood that the specific embodiments described herein are merely used to explain the present disclosure, and are not intend to limit the present disclosure.

Figure 1:
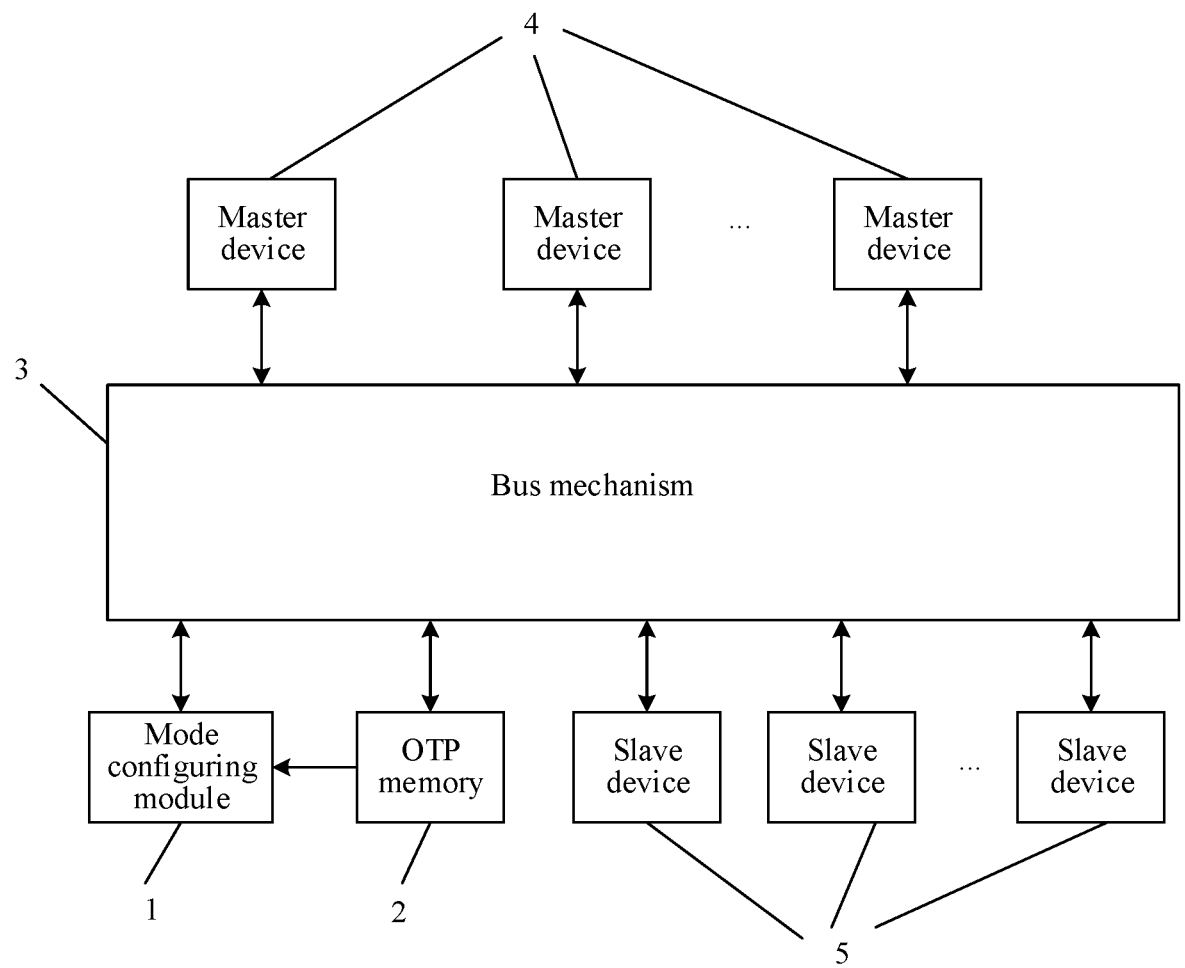
FIG. 1 is a schematic structural diagram of a SoC chip according to a first embodiment of the present disclosure.

A first embodiment of the present disclosure relates to a SoC chip. As shown in FIG. 1, the SoC chip includes a mode configuring module 1, a One Time Programmable (OTP) memory 2, and a bus mechanism 3. The OTP memory 2 is configured to store bus access control information, the bus mechanism 3 includes at least one memory protection unit (MPU) 31 (refer to FIG. 2), and the mode configuring module 1 is respectively connected to the OTP memory 2 and the at least one MPU 31.

Figure 2:
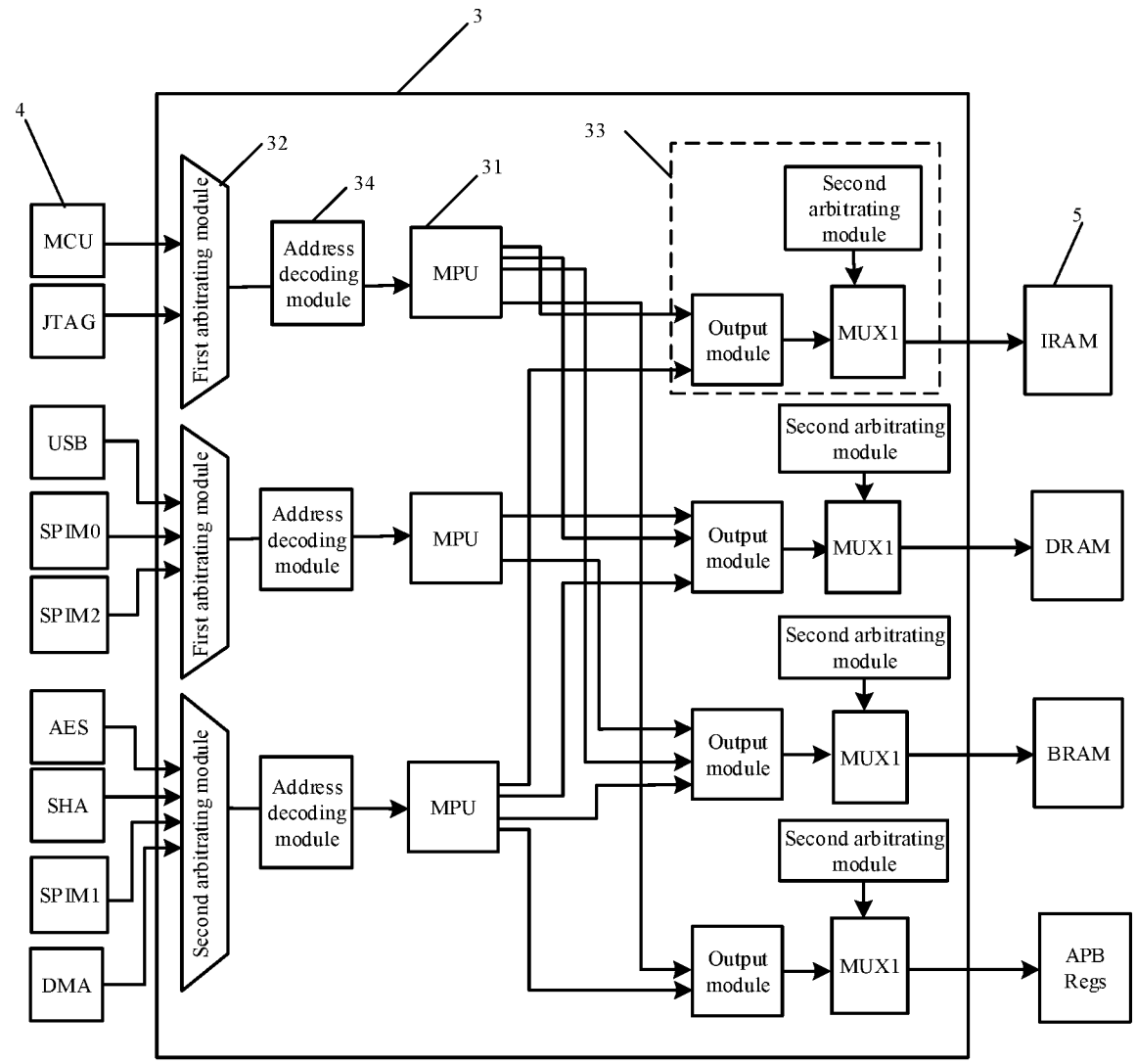
FIG. 2 is a schematic structural diagram of a bus mechanism according to a first embodiment of the present disclosure.

In particular, the bus mechanism 3 may include a plurality of layers of buses, each layer of buses being connected to one MPU 31, at least one master device 4, and at least one slave device 5. One end of the MPU 31 is connected to the master device 4 through a bus, and the other end is connected to the slave device 5 through a bus. In a practical application, the master device 4 connected to the MPU 31 is a master device on a bus of a layer on which the MPU 31 is located, and the slave device 5 connected to the MPU 31 not only includes the slave device on the bus of the layer on which the MPU 31 is located but also may include slave devices on buses of other layers. The master device 4 may include an MCU, a Direct Memory Access (DMA) module, an external communication interface module, a debugging interface module, an encrypting module, and a decrypting module, etc. The slave device 5 may include a random access memory (RAM), a read-only memory (ROM), a flash memory, an electrically erasable programmable read only memory (EEPROM), and other functional modules, the function modules being usually connected to buses through a register interface. FIG. 2 illustrates a bus mechanism 3 including three layers of buses. Master devices 4 on a first layer of buses are an MCU, a JTAG (a system test interface module). Master devices 4 on a second layer of buses are a USB, a serial peripheral interface M0 (SPI M0), and a serial peripheral interface M2 (Serial Peripheral Interface M2). Master devices 4 on a third layer of buses are an Advanced Encrypting Standard (AES) module, a secure hash algorithm (SHA) module, a serial peripheral interface M1 (SPI M1), and a direct memory access (DMA) module. Slave devices 5 are respectively an internal random access memory (IRAM), a dynamic random access memory (DRAM), a block random access memory (BRAM), and APB Regs (a peripheral register space).

It is worth mentioning that, in a practical application, the OTP memory 2 may be connected to one layer of buses. The mode configuring module 1 may be either connected to one layer of buses thereof to implement connection with the OTP memory 2 and MPUs 31 on buses of various layers through the buses, or may be not connected to any layer of buses but to implement connection with the OTP memory 2 and MPUs 31 on the buses of various layers through other lines, which is not limited in this embodiment.

In this embodiment, the OTP memory 2 is configured to store bus access control information. The bus access control information may include information (such as numbers of the master devices) about the master devices 4 connected to various layers of buses, information (such as address information of the slave devices, which may include start addresses of the slave devices, address ranges of the slave devices, etc.) about the slave devices 5, and access rights of the master devices 4 to the slave devices 5. Access rights are mainly classified into four types, namely: RW (read/write), WO (write-only), RO (read-only), NA (unreadable and unwritable), as shown in Table I.

TABLE 1

| | Slave device | |
|---|---|---|
| | Start address of a slave device 1 | Start address of a slave ... device M |
| | Address range of the slave device 1 | Address range of the slave ... device M |
| Master device 1 | RW/WO/RO/NA | ... RW/WO/RO/NA |
| ... | ... | ... ... |
| Start address of a slave device 1 | Start address of a slave ... device M | |
| Address range of the slave device 1 | Address range of the slave ... device M | |
| Master device N | RW/WO/RO/NA | ... RW/WO/RO/NA |

A mode configuring module 1 is configured to read bus access control information from an OTP memory 2 and configure an MPU 31 using the bus access control information when a SoC chip is in a boot mode.

In particular, when the SoC chip is reset or powered on, the SoC chip enters the boot mode. In this case, a plurality of layers of buses in a bus mechanism is controlled by the mode configuring module 1, and a master device 4 on the buses cannot initiate an access request through a bus. In the mode, the mode configuring module 1 reads a mode control word of the OTP memory 2. If the mode control word is an initial value of the OTP memory 2, it indicates that the bus access control information is not written into the OTP memory 2. In this case, the mode configuring module 1 switches the SoC chip to a test mode for a designated master device 4 (such as a test interface device) to write the bus access control information into the OTP memory 2. The designated master device 4 updates the mode control word of the OTP memory 2 to a preset value after writing the bus access control information. Afterwards, the SoC chip is powered on and reset again, and enters the boot mode again. If the mode control word of the OTP memory 2 read by the mode configuring module 1 is the preset value, it indicates that the bus access control information has been written into the OTP memory 2. In this case, the mode configuring module 1 may directly read the bus access control information from the OTP memory 2, and write the bus access control information into the MPU 31 to configure the MPU 31.

The mode configuring module 1 is further configured to enable the MPU 31 and switch the SoC chip to a user mode upon configuration of the MPU 31. In this case, the mode configuring module 1 transfers a control right of a bus to the master device 4, so that the master device 4 sends the access request through the bus.

When the SoC chip is in the user mode, the master device 4 is configured to send the access request through the bus of the layer on which the master device is located, and the MPU 31 is configured to determine, according to the bus access control information, legitimacy of the access request sent through a bus of the current layer. In particular, the access request carries corresponding information (such as numbers of the master devices) of the master devices 4, information (such as address information of the slave devices) of the slave devices 5 that are to be accessed, etc. The MPU 31 may first determine which slave device 5 (that is, determine a slave device 5 corresponding to the access request) a current master device 4 is to access, and then determine, according to the access right in the bus access control information, whether the access is legal when receiving the access request sent through the bus of the layer on which the MPU 31 is located. If yes, the MPU 31 outputs the access request to the slave device corresponding to the access request. If no, the MPU 31 intercepts the illegal access request, returns an error message to the master device 4 corresponding to the illegal access request, and saves the illegal access request for the user to view at any time.

Preferably, in this embodiment, an address decoding module 34 is further connected to each layer of buses, and the MPU 31 is connected, through the address decoding module 34, to a master device 4 on a bus of a layer on which the MPU 31 is located. The address decoding module 34 is configured to determine, according to address information that is of the slave device 5 and contained in the access request when receiving the access request sent by the master device 4, the slave device 5 corresponding to the access request. The address decoding module 34 may output, to the MPU 31, the corresponding access request that the slave device has determined after the slave device 5 is determined. The MPU 31 may determine, directly from the access request, which slave device 5 that the current master device 4 is to access when receiving the access request output by the address decoding module 34.

Preferably, in this embodiment, a first arbitrating module 32 is further connected to each layer of buses. The address decoding module 34 is connected, through the first arbitrating module 32, to the master device 4 on a bus of a layer on which the MPU 31 is located. The first arbitrating module 32 is configured to assign, to one of the master devices 4 according to a first preset policy, a control right of a bus of a layer on which the first arbitrating module 32 is located, and output the access request of the master devices 4 that obtain the control right of the bus of the layer on which the first arbitrating module 32 is located when receiving the access requests sent by at least two master devices 4 at the same time. The first preset policy may be a priority of the master devices, that is, the control rights of the buses are assigned according to the priority of each master device that sends the access request. The first preset policy may also be a polling policy, which is not limited in this embodiment. The first arbitrating module 32 further caches an access request of a master device that does not currently acquire the control right of buses of the layer on which the first arbitrating module is located. When the bus of the layer on which the first arbitrating module is located is idle (the control right of the bus is released), the first arbitrating module 32 may assign, according to the first preset policy again, the control rights of the buses to a master device corresponding to a currently cached access request.

Preferably, the bus mechanism 3 further includes a first gating circuit 33 in a one-to-one correspondence with the slave devices 5, and the MPU 31 is connected to the slave devices 5 through the first gating circuit 33. In particular, the MPU 31 outputs the access request to a first gating circuit 33 of a corresponding slave device 5 when receiving the access request output by the first arbitrating module 32 and determining that the access request is a legal access request. If the first gating circuit 33 only receives one access request sent by the MPU 31 at the same time, the corresponding slave device 5 and the master device 4 corresponding to the access request are conducted to send the received access request to the slave device 5. If the first gating circuit 33 receives access requests sent by at least two MPUs 31 at the same time, a current to-be-responded access request of the slave device may be determined according to a second preset policy, and the slave device and the master device corresponding to the determined access request are conducted. The second preset policy may be a priority of the master device, or may be a polling strategy, which is not limited in this embodiment.

The first gating circuit 33 may include: an output module, a first data selector (that is, MUX 1 in FIG. 2), and a second arbitrating module. The output module includes a plurality of first connecting ends, and a second connecting end. Each first connecting end may be correspondingly connected to one MPU 31, and the second connecting end is connected to the first data selector. The first data selector is further connected to the second arbitrating module and the slave device 5. The output module is configured to receive an access request sent by the MPU 31 to which the output module is connected. The second arbitrating module is configured to determine a current to-be-responded access request of the slave device according to the second preset policy when the output module receives the access requests sent by the at least two MPU 31 at the same time. The first data selector is configured to conduct the slave device 5 and the master device 4 corresponding to a determined access request to send the determined access request to the slave device 5 (the remaining access requests being cached in the output module).

It is worth mentioning that the bus mechanism 3 may further include a second gating circuit in a one-to-one correspondence with the MPU 31. The MPU 31 is further connected to the master device 4 on the bus of the layer through the corresponding second gating circuit. In particular, the slave device 5 responds to an access request sent by the first gating circuit 33 and outputs response information after receiving the access request. The response information may carry information about the slave device and information about the master device. When the MPU 31 receives the response information fed back by the slave device 5, the second gating circuit determines a corresponding slave device 5 according to the response information, and conducts a determined corresponding slave device 5 and a master device that currently acquires a control right of a bus of a layer on which the second gating circuit is located, so as to send the response information to the master device that acquires the control right of the bus of the layer on which the second gating circuit is located.

Figure 3:
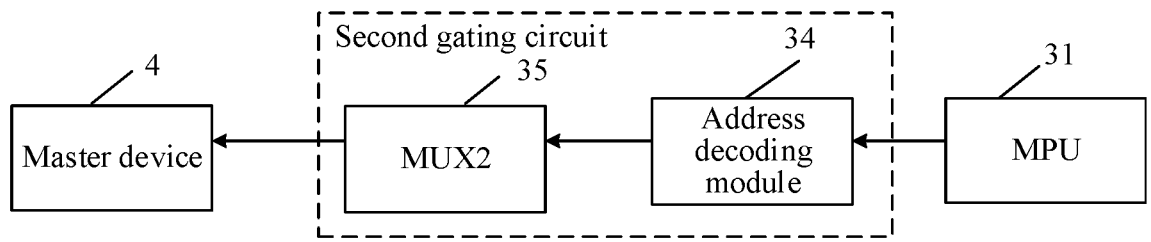
FIG. 3 is a schematic structural diagram of a second gating circuit according to a first embodiment of the present disclosure.

As shown in FIG. 3, the second gating circuit may consist of a second data selector 35 (that is, MUX 2 in FIG. 3) and an address decoding module 34, the second data selector 35 being connected between the master device 4 and the address decoding module 34. The address decoding module 34 is configured to determine the corresponding slave device 5 according to the response information, and the second data selector 35 is configured to conduct the determined slave device 5 and the master device 4 that currently acquires a control right of a bus of a layer on which the second data selector 35 is located.

In comparison to existing technologies, in the embodiment, an OTP memory is used to store the bus access control information, so that the corresponding bus access control information may be written into the OTP memory depending on requirements for different application scenarios, thereby being adapted to different application scenarios and having high flexibility. In addition, in the embodiments of the present disclosure, a reading and configuration process of the bus access control information is controlled using the mode configuring module implemented by hardware, so that the process cannot be controlled and tampered by the outside, which can help improve security of the bus access control information.

A second embodiment of the present disclosure relates to a SoC chip. This embodiment is a further improvement on the basis of the first embodiment, and main improvements lie in that: in this embodiment, bus access control information stored in an OTP memory is further encrypted to improve security of the bus access control information.

In this embodiment, an encrypting module is disposed in the OTP memory 2, the encrypting module being configured to encrypt the bus access control information written into the OTP memory 2. The bus access control information is stored in the OTP memory 2 in the form of ciphertext after being encrypted by the encrypting module. In a practical application, the encrypting module may encrypt the bus access control information using a key (that is, a key generated by hardware outside the OTP memory) that is externally invisible to the outside and that is preset by hardware. After being encrypted by the encrypting module, in a boot mode, the bus access control information read by a mode configuring module 1 from the OTP memory 2 is encrypted bus access control information.

Figure 4:
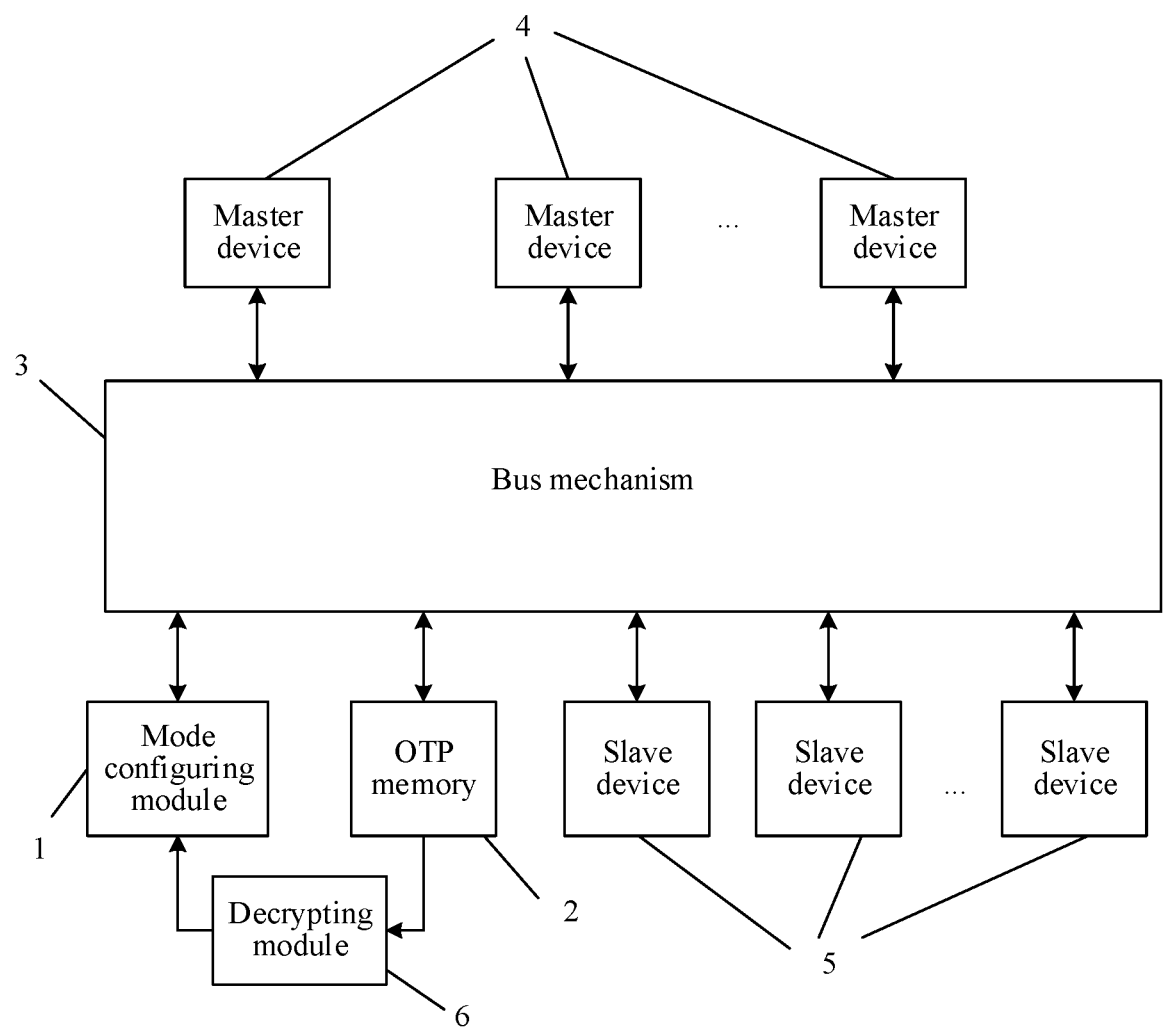
FIG. 4 is a schematic structural diagram of a SoC chip according to a second embodiment of the present disclosure.

In this embodiment, as shown in FIG. 4, the SoC chip further includes a decrypting module 6, the decrypting module 6 is respectively connected to the mode configuring module 1 and the OTP memory 2. The mode configuring module 1 may call the decrypting module 6 to decrypt the read bus access control information, and write the decrypted bus access control information into an MPU 31 to configure the MPU 31. The decrypting module 6 may use a public or private symmetric cryptographic algorithm and use a key (that is, the key preset by hardware) the same as that of the encrypting module for decryption.

It is worth mentioning that, in this embodiment, the encrypting module is disposed in the OTP memory 2 is used as an example. However, in a practical application, the encrypting module may also be disposed outside the OTP memory 2. When the encrypting module is disposed outside the OTP memory 2, the encrypting module may detect an interface of the OTP memory 2. When the encrypting module detects that a designated master device writes the bus access control information into the OTP memory 2, the encrypting module may encrypt the bus access control information written into the OTP memory 2.

In comparison to the first embodiment, in this embodiment, the bus access control information stored in the OTP memory is encrypted and decrypted using the key preset by hardware. The key preset by hardware is an externally invisible key, so that an attacker cannot acquire the key and thus cannot acquire plaintext of the bus access control information, improving security of the bus access control information.

A third embodiment of the present disclosure relates to a SoC chip. This embodiment is a further improvement on the basis of the second embodiment, and main improvements lie in that: in this embodiment, verification information corresponding to the encrypted bus access control information is stored in the OTP memory when the bus access control information stored in the OTP memory is encrypted.

In particular, in this embodiment, the mode configuring module 1 is further configured to calculate the verification information corresponding to the encrypted bus access control information, and write the verification information into the OTP memory 2 after the encrypting module encrypts the bus access control information.

The mode configuring module 1 reads the verification information and uses the verification information to verify the encrypted bus access control information that is currently read when reading the encrypted bus access control information from the OTP memory 2. If the verification succeeds, it indicates that the currently read bus access control information is not modified. In this case, the mode configuring module 1 may call the decrypting module 6 to decrypt the read bus access control information. If the verification fails, it indicates that the currently read bus access control information is already illegally modified. In this case, the mode configuring module 1 may trigger a security alarm signal to reset the chip integrally. In a practical application, the encrypted bus access control information that is currently read is verified using the verification information in a method such as cyclic redundancy check (CRC) or parity check, etc.

In comparison to the second embodiment, in this embodiment, when the bus access control information stored in the OTP memory is encrypted, the verification information corresponding to the encrypted bus access control information is stored in the OTP memory, helping to further prevent an attacker from illegally modifying the bus access control information and improving security of the SoC chip.

Figure 5:
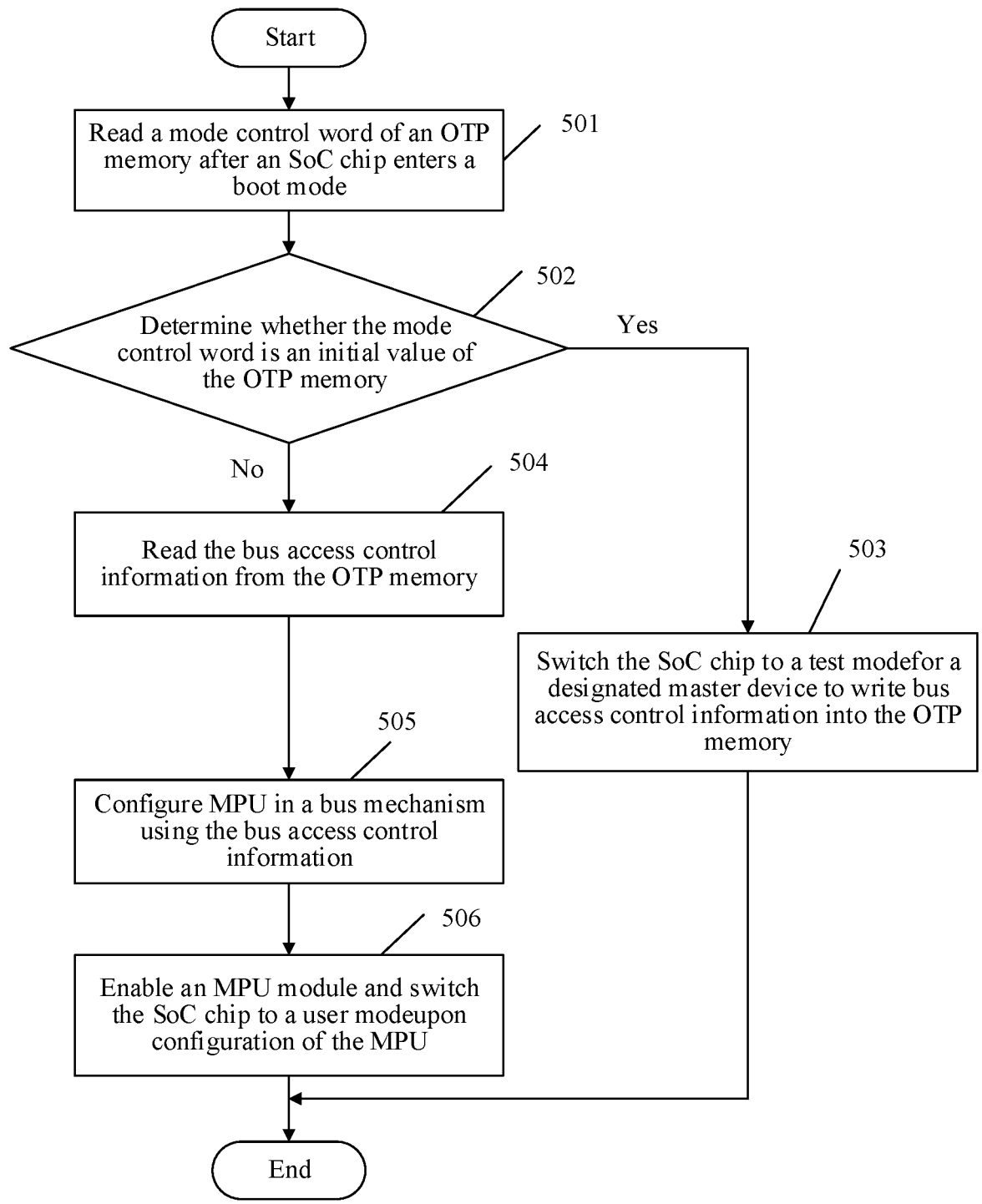
FIG. 5 is a specific flowchart of a bus access control method according to a fourth embodiment of the present disclosure.

A fourth embodiment of the present disclosure relates to a bus access control method. The method is applied to the SoC chip in the first embodiment, and a specific process thereof is shown in FIG. 5.

Step 501: A mode configuring module reads a mode control word of an OTP memory after the SOC chip enters a boot mode.

Step 502: The mode configuring module determines whether the mode control word is an initial value of the OTP memory. If yes, proceed to step 503; or if no, proceed to step 504.

Step 503: The mode configuring module switches the SoC chip to a test mode for a designated master device to write bus access control information into the OTP memory.

In the test mode, the mode configuring module transfers a control right of a bus to the designated master device (a test interface device), the designated master device writing the bus access control information into the OTP memory through the bus. The designated master device may update the mode control word of the OTP memory to a preset value after writing the bus access control information. Afterwards, the SoC chip will be powered on and reset again.

Step 504: The mode configuring module reads the bus access control information from the OTP memory.

Step 505: The mode configuring module configures an MPU in a bus mechanism using the bus access control information.

The mode configuring module may write the bus access control information into the MPUs on buses on each layer to configure the MPUs after reading the bus access control information from the OTP memory.

Step 506: The mode configuring module enables the MPU and switches the SOC chip to a user mode upon configuration of the MPU.

The mode configuring module controls the SoC chip to enter the user mode upon configuration of the MPU. In this case, a control right of a bus is transferred to the master device, and the master device may send an access request through the bus.

It is worth mentioning that, in this embodiment, the bus mechanism is a multi-layer bus interconnecting structure, all bus master devices are arranged in a hierarchical order, and there is an independent MPU on each layer. When the master device sends the access request through the bus, the MPU may determine, according to information about the slave device in the bus access control information, which slave device that the current master device is to access, and determine, according to the access right in the bus access control information, whether the access is legal. For an illegal access request, the MPU intercepts the access request. For each intercepted access request, the MPU generates a corresponding interrupt signal (returning an error message to the master device corresponding to the illegal access request), and saves the illegal access request.

Because the first embodiment corresponds to this embodiment, this embodiment may be combined with the first embodiment for implementation. Related technical details mentioned in the first embodiment are still valid in this embodiment, and technical effects that can be achieved in the first embodiment may also be implemented in this embodiment. In order to reduce repetition, details are not described herein again. Correspondingly, related technical details mentioned in this embodiment may also be applied to the first embodiment.

In comparison to existing technologies, in the embodiment, an OTP memory is used to store the bus access control information, so that the corresponding bus access control information may be written into the OTP memory depending on requirements for different application scenarios, thereby being adapted to different application scenarios and having high flexibility. In addition, in the embodiments of the present disclosure, a reading and configuration process of the bus access control information is controlled using the mode configuring module implemented by hardware, so that the process cannot be controlled and tampered by the outside, which can help improve security of the bus access control information.

Figure 6:
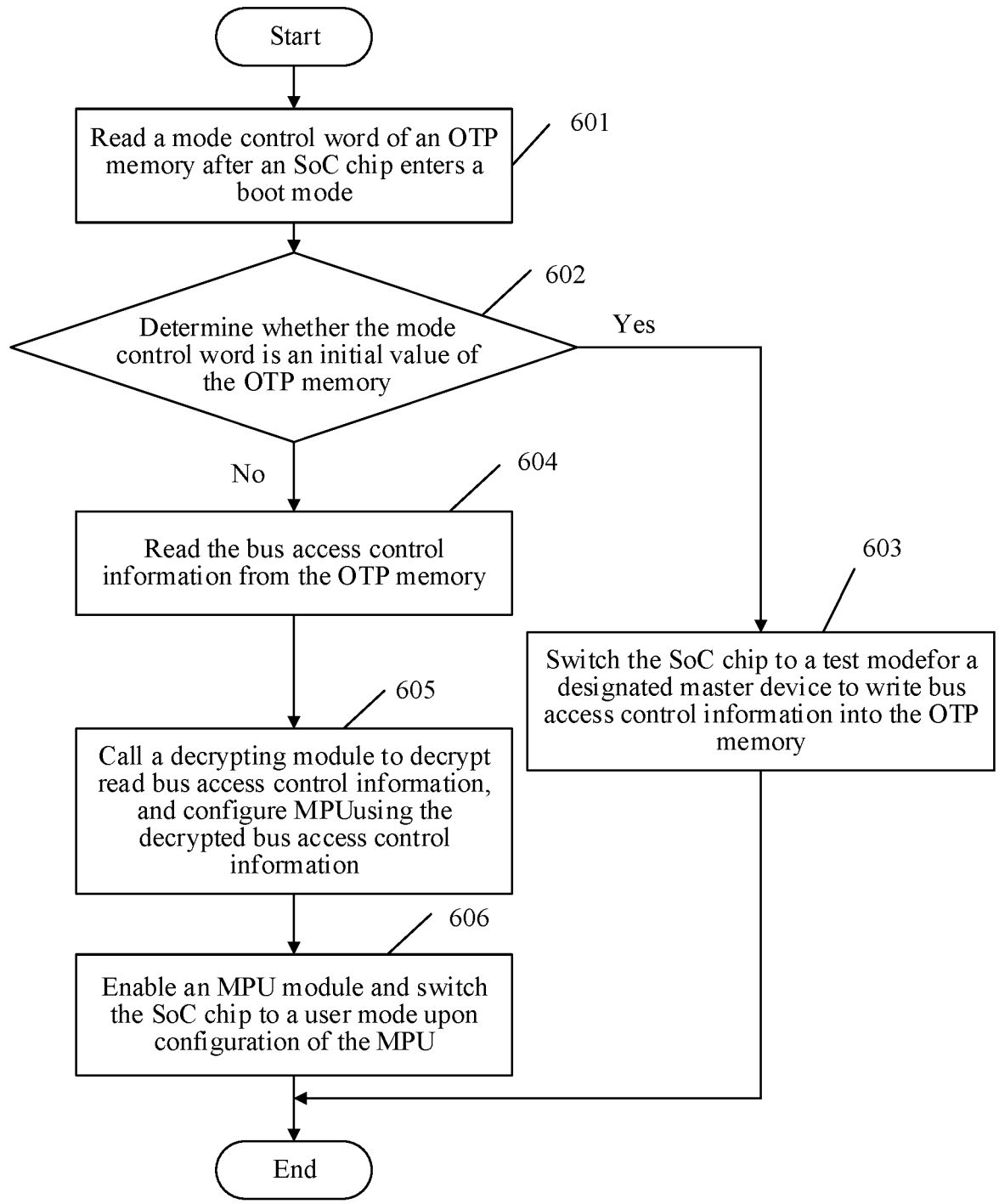
FIG. 6 is a specific flowchart of a bus access control method according to a fifth embodiment of the present disclosure.

A fifth embodiment of the present disclosure relates to a bus access control method. This embodiment is a further improvement on the basis of the fourth embodiment, and main improvements lie in that: in this embodiment, bus access control information stored in an OTP memory is further encrypted, and a specific process thereof is shown in FIG. 6.

Steps 601 to 604 and 606 are the same as steps 501 to 504 and 506, and details are not described again in this embodiment.

Step 605: The mode configuring module calls a decrypting module to decrypt read bus access control information, and configures the MPU using decrypted bus access control information.

In this embodiment, an encrypting module is disposed in the OTP memory, the encrypting module encrypting the bus access control information written into the OTP memory. Therefore, in this embodiment, the bus access control information read by the mode configuring module from the OTP memory is the encrypted bus access control information. Therefore, the mode configuring module may call the decrypting module to decrypt the read bus access control information, and then write the decrypted bus access control information into the MPU to configure the MPU after configuring the MPU using the read bus access control information.

It is worth mentioning that the decrypting module in this embodiment may use a public or private symmetric cryptographic algorithm to use a key the same as that of the encrypting module. The key may be an externally invisible key preset by hardware.

Because the second embodiment corresponds to this embodiment, this embodiment may be combined with the second embodiment for implementation. Related technical details mentioned in the second embodiment are still valid in this embodiment, and technical effects that can be achieved in the second embodiment may also be achieved in this embodiment. In order to reduce repetition, details are not described herein again. Correspondingly, related technical details mentioned in this embodiment may also be applied to the second embodiment.

In comparison to the fourth embodiment, in this embodiment, the bus access control information stored in the OTP memory is encrypted and decrypted using the key preset by hardware, so that an attacker cannot acquire the hardware key and thus cannot acquire plaintext of the bus access control information, improving security of the bus access control information.

Figure 7:
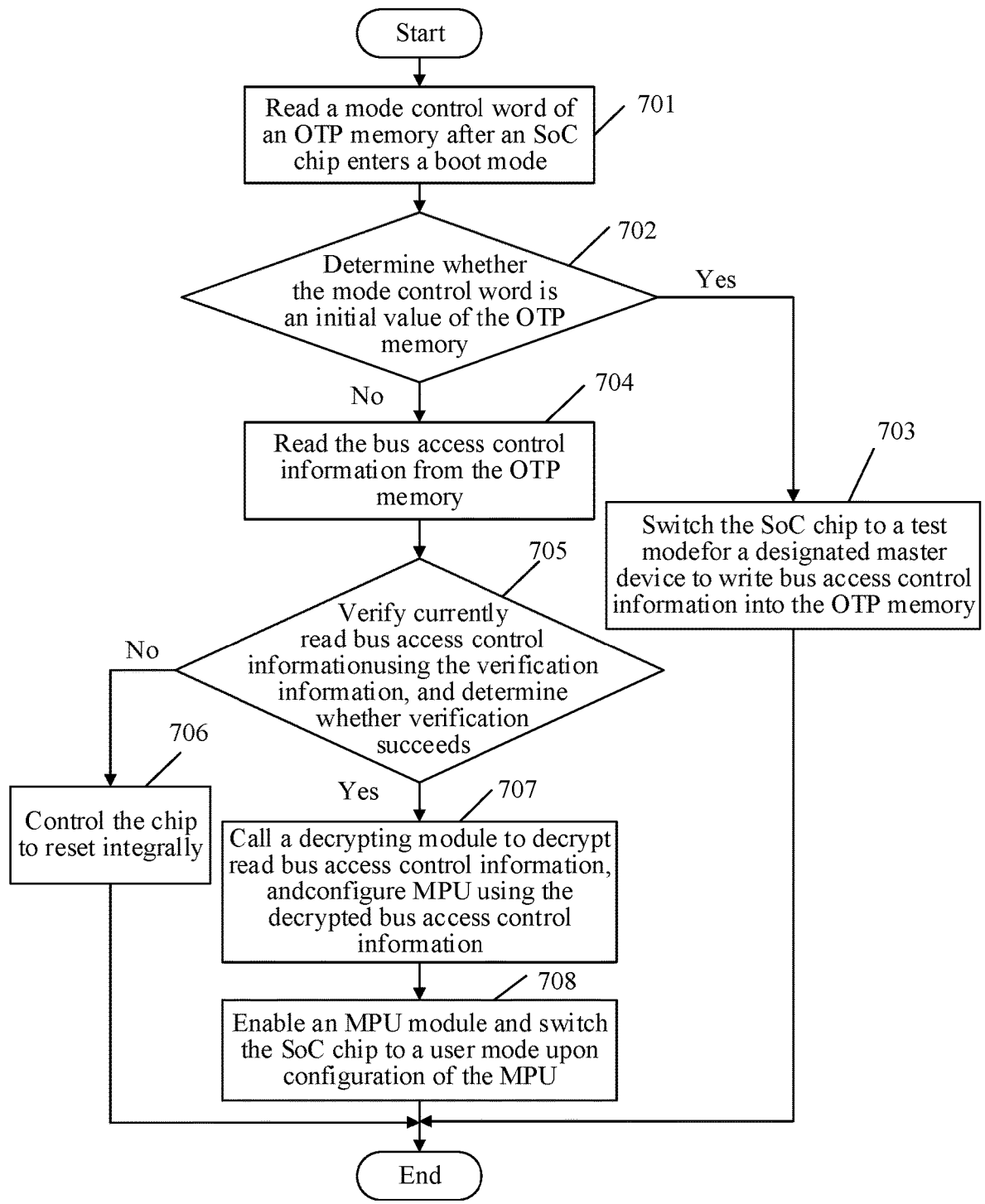
FIG. 7 is a specific flowchart of a bus access control method according to a sixth embodiment of the present disclosure.

A sixth embodiment of the present disclosure relates to a bus access control method. This embodiment is a further improvement on the basis of the fifth embodiment, and main improvements lie in that: in this embodiment, verification information corresponding to the encrypted bus access control information is stored into the OTP memory when the bus access control information stored in the OTP memory is encrypted, and a specific process thereof is shown in FIG. 7.

Steps 701 to 703 and 708 are the same as steps 601 to 603 and 606, and details are not described again in this embodiment.

Step 704: The mode configuring module reads the bus access control information and verification information from the OTP memory.

In this embodiment, the mode configuring module further calculates the verification information corresponding to the encrypted bus access control information, and writes the verification information into the OTP memory after the encrypting module encrypts the bus access control information.

Step 705: The mode configuring module verifies, using the verification information, the encrypted bus access control information that is currently read, and determines whether the verification succeeds. If yes, proceed to step 707; or if no, proceed to step 706.

In a practical application, the encrypted bus access control information that is currently read is verified using the verification information in a method such as CRC or parity check, etc.

Step 706: The mode configuring module controls a chip to reset integrally.

If the verification fails, it indicates that the current bus access control information is already illegally modified. In this case, the mode configuring module may trigger a security alarm signal to reset the chip integrally.

Step 707: The mode configuring module calls a decrypting module to decrypt read bus access control information, and configures the MPU using decrypted bus access control information.

If the verification succeeds, it indicates the current bus access control information is not modified. In this case, the mode configuring module may call the decrypting module to decrypt the read bus access control information, and write the decrypted bus access control information into the MPU.

Because the third embodiment corresponds to this embodiment, when the bus access control information stored in the OTP memory is encrypted, the verification information corresponding to the encrypted bus access control information is stored in the OTP memory, helping to further prevent an attacker from illegally modifying the bus access control information and improving security of the SoC chip.

A person of ordinary skill in the art may understand that the foregoing embodiments are specific examples to implement the present disclosure, and variations can be made in forms and details thereto in actual application without departing from the spirit and scope of the present disclosure.

What is claimed is:

1. A System-on-a-Chip SoC chip, comprising:
   a bus mechanism comprising at least one Memory Protection Unit MPU;

a One Time Programmable OTP memory configured to store bus access control information; and a mode configuring module configured to connect the at least one MPU to the OTP memory, the mode configuring module configured to:
read the bus access control information from the OTP memory when the SoC chip is in a boot mode; and
configure the MPU using the bus access control information;
wherein the mode configuring module is further configured to enable the MPU and switch the SoC chip to a user mode upon configuration of the MPU;
wherein an encrypting module is disposed in the OTP memory, the encrypting module configured to encrypt, using a key preset by hardware, the bus access control information that is written into the OTP memory;
wherein the SoC chip further comprises a decrypting module configured to connect the mode configuring module to the OTP memory;
wherein the mode configuring module is further configured to:
call the decrypting module;
decrypt the read bus access control information using the key preset by hardware; and
write the decrypted bus access control information into the MPU;
wherein the mode configuring module is further configured to:
calculate verification information corresponding to the encrypted bus access control information, and
write the verification information into the OTP memory after the encrypting module encrypts the bus access control information; and
wherein the mode configuring module is further configured to:
read the verification information from the OTP memory,
verify, using the corresponding verification information, encrypted bus access control information that is currently read, and
call the decrypting module to decrypt the read bus access control information when the verification succeeds.

2. The SoC chip according to claim 1, wherein the mode configuring module is further configured to control the SoC chip to reset integrally when the verification fails.

3. The SoC chip according to claim 1, wherein the bus mechanism comprises a plurality of layers of buses, each layer of buses being connected to one MPU, at least one master device and at least one slave device; and
wherein one end of the MPU is connected to a master device, and the other end is connected to a slave device.

4. The SoC chip according to claim 3, wherein when the SoC chip is in the user mode, the master device is configured to send an access request through a bus of a layer on which the master device is located; and
wherein the MPU is configured to determine, according to the bus access control information, legitimacy of the access request sent by the bus of the layer on which the MPU is located, and output a legal access request to the slave device that corresponds to the access request.

5. The SoC chip according to claim 4, wherein the MPU is further configured to intercept an illegal access request sent by the bus of the layer on which the MPU is located, return an error message to the master device corresponding to the illegal access request, and save the illegal access request.

6. The SoC chip according to claim 3, wherein an address decoding module is further connected on each layer of buses, one end of the MPU being connected to the master device through the address decoding module; and
wherein the address decoding module is configured to:
when receiving the access request sent by the master device, determine, according to address information of the slave device in the access request, the slave device that corresponds to the access request, and
output the access request determined by the slave device to the MPU.

7. The SoC chip according to claim 6, wherein a first arbitrating module is further connected to each layer of buses, and the address decoding module is connected to the master device through the first arbitrating module; and
wherein the first arbitrating module is configured to:
assign, to one of the master devices according to a first preset policy when receiving access requests sent by at least two master devices at the same time, a control right of a bus on a layer on which the first arbitrating module is located, and
output the access request of the master device that obtains the control right of the bus of the layer on which the first arbitrating module is located.

8. The SoC chip according to claim 3, wherein the bus mechanism further comprises one or more first gating circuits each of which corresponds to one of the at least one slave device, the other end of each MPU being connected to a slave device through a first gating circuit; and
wherein the first gating circuit being configured to:
when receiving access requests sent by at least two MPUs at the same time, determine, according to a second preset policy, an access request to be responded of the slave device; and,
conduct the slave device and the master device that corresponds to the determined access request.

9. The SoC chip according to claim 3, wherein the bus mechanism further comprises one or more second gating circuits each of which corresponds to one of the MPUs, and each of the MPUs is further connected to the master device through a second gating circuit;
wherein each of the MPUs is further configured to receive response information sent by the slave devices; and
wherein each of the one or more second gating circuits is configured to:
determine, according to the response information, the slave device that corresponds to the response information; and
conduct the determined slave device and the master device that currently has a control of a bus of a layer on which a second gating circuit is located.

10. The SoC chip according to claim 1, wherein the mode configuring module is further configured to:
switch the SoC chip to a test mode so that a designated master device writes the bus access control information into the OTP memory, when the SoC chip is in the boot mode and a mode control word of the OTP memory is an initial value.

11. A method for controlling bus access, wherein the method is applied to a System-on-a-Chip SoC chip comprising:
a bus mechanism comprising at least one Memory Protection Unit MPU;

a One Time Programmable OTP memory configured to store bus access control information; and a mode configuring module configured to connect the at least one MPU to the OTP memory;

wherein the method comprises:

reading, by the mode configuring module, the bus access control information from the OTP memory when the SoC chip is in a boot mode;

configuring, by the mode configuring module, the MPU using the bus access control information; and, enabling, by the mode configuring module, the MPU and switching the SoC chip to a user mode upon configuration of the MPU;

wherein an encrypting module is disposed in the OTP memory, the encrypting module configured to encrypt, using key preset by hardware, the bus access control information that is written into the OTP memory; and wherein the configuring, by the mode configuring module, the MPU using the bus access control information comprises:

calling, by the mode configuring module, a decrypting module to decrypt the read bus access control information using the key preset by hardware; and writing the decrypted bus access control information into the MPU; and wherein before the calling a decrypting module to decrypt the read bus access control information using the key preset by hardware, the method further comprises:

reading verification information from the OTP memory, wherein the mode configuring module calculates, after the encrypting module encrypts the bus access control information, the verification information corresponding to the encrypted bus access control information, and writes the verification information into the OTP memory;

verifying, using the verification information, the encrypted bus access control information that is currently read; and, calling a decrypting module to decrypt the read bus access control information when verification succeeds.

12. The method according to claim 11, wherein when the verification fails, the method further comprises controlling the SoC chip to reset integrally.

13. The method according to claim 11, wherein before the reading the bus access control information from the OTP memory, the method further comprises:

reading a mode control word of the OTP memory; and determining whether the mode control word is an initial value of the OTP memory;

upon a positive determination, switching the SoC chip to a test mode for a designated master device to write the bus access control information into the OTP memory;

upon a negative determination, reading the bus access control information.

* * * * *